US007682586B2

(12) United States Patent  
Harold et al.

(10) Patent No.: US 7,682,586 B2
(45) Date of Patent: Mar. 23, 2010

(54) THERMAL DECOMPOSITION OF UREA IN A SIDE STREAM OF COMBUSTION FLUE GAS USING A REGENERATIVE HEAT EXCHANGER

(75) Inventors: John R. Harold, Worcester, MA (US); Clayton A. Erickson, Princeton, MA (US)

(73) Assignee: Babcock Power Environmental, Inc., Worcester, MA (US)

(*) Notice: Subject to any disclaimer, the term of this patent is extended or adjusted under 35 U.S.C. 154(b) by 70 days.

(21) Appl. No.: 11/843,340

(22) Filed: Aug. 22, 2007

(65) Prior Publication Data

US 2008/0050297 A1    Feb. 28, 2008

Related U.S. Application Data

(60) Provisional application No. 60/839,364, filed on Aug. 22, 2006.

(51) Int. Cl.
*C01C 1/08* (2006.01)

(52) U.S. Cl. .................. 423/352; 423/358; 423/239.1; 165/4; 165/104.11; 165/104.14; 165/909

(58) Field of Classification Search .............. 423/239.1, 423/352, 358; 422/148, 175, 206; 165/4, 165/104.11, 104.14, 909
See application file for complete search history.

(56) References Cited

U.S. PATENT DOCUMENTS

| 4,107,272 A | 8/1978 | Mori et al. |
| 4,138,469 A | 2/1979 | Kato et al. |
| 4,268,488 A | 5/1981 | Ginger |
| 4,393,031 A | 7/1983 | Henke |
| 4,678,643 A | 7/1987 | Fetzer et al. |
| 5,281,403 A | 1/1994 | Jones |
| 5,421,194 A | 6/1995 | Doyle et al. |
| 5,547,650 A | 8/1996 | Edgar et al. |
| 5,589,142 A * | 12/1996 | Gribbon ............ 422/171 |
| 5,827,490 A | 10/1998 | Jones |
| 5,985,224 A | 11/1999 | Lagana et al. |
| 6,077,491 A | 6/2000 | Cooper et al. |

(Continued)

FOREIGN PATENT DOCUMENTS

CA    1 100 292    5/1981

(Continued)

OTHER PUBLICATIONS

International Preliminary Report on Patentability for International Application No. PCT/US2007/018515 dated Feb. 24, 2009 (8 pages).

(Continued)

*Primary Examiner*—Timothy C Vanoy

(57) ABSTRACT

This invention relates generally to the treatment of NOx in combustion flue gas. In certain embodiments, the invention relates to the use of a regenerative heat exchanger (RHE) to convert urea to ammonia in a side stream of flue gas. Ammonia and/or other urea decomposition products exit the heat exchanger, are mixed with the rest of the flue gas, and enter a selective catalytic reduction (SCR) unit for reduction of NOx in the flue gas. The use of an RHE significantly improves the thermal efficiency of the overall process. More particularly, in certain embodiments, the regenerative heat exchanger is a dual chamber RHE.

5 Claims, 1 Drawing Sheet

U.S. PATENT DOCUMENTS

| | | |
|---|---|---|
| 6,093,380 A | 7/2000 | Lagana et al. |
| 6,322,762 B1 | 11/2001 | Cooper et al. |
| 6,403,046 B1 | 6/2002 | Spokoyny |
| 6,436,359 B1 | 8/2002 | Spencer, III et al. |
| 6,491,885 B1 | 12/2002 | Tokunaga et al. |
| 6,506,350 B2 | 1/2003 | Cooper et al. |
| 6,616,901 B1 | 9/2003 | Lagana et al. |
| 6,730,280 B2 | 5/2004 | Cooper et al. |
| 6,761,868 B2 | 7/2004 | Brooks et al. |
| 6,887,449 B2 | 5/2005 | Brooks et al. |
| 7,008,603 B2 | 3/2006 | Brooks et al. |
| 7,090,810 B2 | 8/2006 | Sun et al. |
| 7,220,395 B2 | 5/2007 | Cooper et al. |
| 7,273,595 B2 | 9/2007 | Spokoyny |
| 7,416,715 B2 | 8/2008 | Spokoyny |
| 2003/0211024 A1 | 11/2003 | Wojichowski |
| 2006/0115402 A1 | 6/2006 | Sun et al. |
| 2006/0251554 A1 | 11/2006 | Doucet et al. |
| 2008/0050297 A1 | 2/2008 | Harold et al. |
| 2008/0211118 A1 | 9/2008 | Wyse et al. |
| 2008/0267837 A1 | 10/2008 | Phelps et al. |
| 2008/0292511 A1 | 11/2008 | Spokoyny |

FOREIGN PATENT DOCUMENTS

| | | |
|---|---|---|
| DE | 38 00 730 | 8/1988 |
| DE | 43 13 861 | 11/1994 |
| DE | 43 13 861 A1 * | 11/1994 |
| DE | 197 20 205 | 11/1998 |
| EP | 0 199 186 | 10/1986 |
| EP | 0 210 392 | 2/1987 |
| EP | 0 487 886 | 6/1992 |
| WO | WO-98/42623 | 10/1998 |

OTHER PUBLICATIONS

International Search Report and Written Opinion for International Application No. PCT/US2007/018515 dated Feb. 18, 2008 (14 pages).

Communication pursuant to Article 94(3) EPC for European Patent Application No. 07 837 172.1, dated Sep. 23, 2009 (3 pages).

* cited by examiner

THERMAL DECOMPOSITION OF UREA IN A SIDE STREAM OF COMBUSTION FLUE GAS USING A REGENERATIVE HEAT EXCHANGER

CROSS-REFERENCE TO RELATED APPLICATION

This application claims priority to and the benefit of U.S. provisional patent application Ser. No. 60/839,364, filed Aug. 22, 2006, the disclosure of which is incorporated herein by reference in its entirety.

FIELD OF THE INVENTION

This invention relates generally to the treatment of nitrogen oxides (NOx) in combustion flue gas. More particularly, in certain embodiments, the invention relates to the use of a regenerative heat exchanger (RHE) to convert urea to ammonia in a side stream of flue gas, the reaction product being carried with the flue gas into a selective catalytic reduction (SCR) unit for reduction of NOx present in the flue gas.

BACKGROUND OF THE INVENTION

The reduction of emission of NOx generated by combustion processes is of increasing importance. Technologies that seek to reduce NOx by modifying combustion conditions and fuels are known as primary measures, while technologies that treat the exhaust resulting from combustion are known as secondary measures.

Among secondary measures are selective catalytic reduction (SCR) and selective noncatalytic reduction (SNCR), both of which are conducted with ammonia and urea as reducing agents. The direct use of ammonia in these processes is difficult, because of safety problems associated with its storage, handling, and transport. Direct use of urea is safer, but there are high energy requirements for converting urea from a solid or aqueous form into an active gaseous species.

A method of selective catalytic reduction of NOx using a side stream of combustion flue gas is described in U.S. patent application Ser. No. 11/275,989, filed on Feb. 8, 2006, and published on Jun. 1, 2006, as U.S. Patent Application Publication No. US2006/0115402, the entirety of which is incorporated herein by reference. The described method seeks to overcome the difficulty of converting urea to ammonia for use in an ammonia-SCR NOx treatment process by making use of a side stream (e.g. slipstream) of the combustion flue gas to be treated. This side stream, generally no more than about 3% of the total flue gas to be treated, is directed through a channel into which urea is injected. The side stream is heated so that the injected urea is decomposed, and the reaction products are carried with the side stream of flue gas into an injection grid of an SCR unit. The method achieves uniform mixing of active gaseous reactants for NOx reduction by SCR.

A disadvantage of this process is its thermal inefficiency. Conventional heat exchangers (e.g. as shown in US2006/0115402 at reference 22 of FIGS. 1-11) often do not provide sufficient heat for conversion of urea to ammonia. This necessitates the use of a burner to directly heat the side stream (e.g. as shown in US2006/0115402 at reference 38 in FIGS. 2-6 and 11). The burner consumes fuel and is inefficient, since the heat it creates is not harnessed for later use.

There is a need for a more thermally efficient process for converting urea to ammonia in a side stream of combustion flue gas for catalytic reduction of NOx via SCR.

SUMMARY OF THE INVENTION

The invention provides a solution to the thermal efficiency problem seen in previous methods for converting urea to ammonia in a side stream of combustion flue gas for selective catalytic reduction (SCR) of NOx in the combustion flue gas.

In one embodiment, a side stream of combustion flue gas is directed into a regenerative heat exchanger (RHE), for example, a dual chamber RHE. Between the two chambers is a retention chamber which is maintained at a high temperature (e.g. between about 1175° F. and about 1225° F.) by operation of a burner, or, alternatively, a steam coil heater, heat exchanger, or other heating unit. The temperature in the retention chamber is sufficient to convert an injected aqueous urea solution to gaseous ammonia and carbon dioxide, and the retention chamber is sized to provide adequate residence time for substantially complete conversion of the urea.

The direction of gas flow in the dual chamber RHE is reversed in cycles, alternating between flow from the first to the second chamber and flow from the second to the first chamber. In this way, the ceramic chamber through which hot reaction product passes absorbs and retains heat, which serves to "preheat" the flue gas that travels through the ceramic chamber during the following cycle, on its way to the retention chamber. Thus, the heat produced by the burner is conserved and the thermal efficiency is improved. Less fuel (or other energy source) is required to maintain the retention chamber at the sufficient temperature for conversion of aqueous urea solution to gaseous ammonia.

After conversion of the urea, the flue gas and gaseous decomposition products (e.g. ammonia) exit the RHE at a temperature at least about 50° F. above its dew point, whereupon it is mixed with the rest of the flue gas and is sent to a selective catalytic reduction unit (SCR) for reduction of NOx in the flue gas.

A further advantage of the process is that it responds instantly to load changes, and produces ammonia as needed, without requiring high pressure vessels or piping.

In one aspect, the invention relates to a process including a regenerative heat exchanger (RHE) for producing a reactant gas from a NOx-reducing reagent in a side stream of flue gas from a combustor. In a preferred embodiment, the reactant gas includes ammonia. In certain embodiments, the NOx-reducing reagent includes urea; for example, the NOx-reducing agent may be an aqueous urea solution.

In general, the NOx-reducing reagent is capable of generating the reactant gas upon heating. In certain embodiments, heating the NOx-reducing reagent produces a reactant gas containing ammonia, as well as HNCO, which reacts with water to form ammonia and carbon dioxide, without perhydrolysis of the NOx-reducing reagent, thereby reducing the attendant risk of clogging of nozzles and other equipment.

Urea can be gasified to form ammonia and HNCO (which can further react with water to form ammonia and carbon dioxide). Other NOx-reducing reagents that can be gasified to form ammonia and HNCO, and which can be used in various embodiments of the invention, include the following: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acids; biuret; triuret; cyanuric acid; isocyanic acid; urea formaldehyde; melamine; tricyanourea; and mixtures of two or more of these. Other NOx-reducing reagents that can be used in the invention that do not form HNCO, but decompose to a mixture of gases including hydrocarbons, include amines and their salts (e.g. their carbonates), for example, guanidine, guanidine carbonate, methyl amine carbonate, ethyl amine carbonate, dimethyl amine carbonate, hexamethylamine, hexamethylamine carbonate, and byproduct wastes containing urea from a chemical process. Amines with higher alkyls can be employed to the extent that the hydrocarbon components released do not interfere with the NOx-reduction reaction.

Urea, or other NOx-reducing reagents, that can be used in various embodiments includes commercial and equivalent forms. Generally, commercial forms of urea contain about 95 wt. % or more urea. In certain embodiments, this relatively pure form of urea is preferred.

In certain embodiments, the NOx-reducing reagent is introduced at a rate that is relative to the NOx concentration in the combined flue gas stream. Where the NOx-reducing reagent is or contains an aqueous solution of urea, the rate of introduction of urea solution is such that it provides an NSR of from about 0.1 to about 2, depending on a number of factors, but more typically is within the range of from about 0.5 to about 1.1. The term "NSR" refers to the relative equivalents of nitrogen in the urea or other NOx-reducing reagent to the equivalents of nitrogen in the NOx in the flue gas to be treated.

In preferred embodiments, the reactant gas, once formed, is carried along with the flue gas from the regenerative heat exchanger unit (RHE) into a selective catalytic reduction unit (SCR). Before, after, and/or during such transport to the SCR, the flue gas and reactant gas may be mixed with the rest of the flue gas from which the side stream was divided. Mixing may be accomplished using an injection grid, a plurality of nozzles with or without static gas mixers, or any other suitable method to achieve the desired distribution profile upstream of the SCR.

In certain embodiments, the RHE unit is a dual chamber RHE. Other embodiments use a three-, four-, or more chambered RHE. It is preferred that the RHE have at least two chambers, to enable the gas flow reversal that results in improved thermal efficiency. For example, in an embodiment using a dual chamber RHE, the gas flow reverses direction in cycles, e.g., such that hot reaction product heats a chamber through which flue gas will enter the RHE in the following cycle, thereby conserving heat. In certain embodiments, the RHE is a regenerative thermal oxidizer (RTO).

In another aspect, the invention relates to an apparatus for producing a reactant gas from a NOx-reducing reagent in a side stream of flue gas from a combustor, the apparatus including: a regenerative heat exchanger unit (RHE) with at least two chambers; a conduit system by which the side stream of flue gas enters and exists the RHE; a heat source capable of maintaining a portion of the RHE at a sufficient temperature for production of the reactant gas from the NOx-reducing reagent; and a valve system by which flow through the RHE can be reversed in cycles. The description of elements of the embodiments above can be applied in this aspect of the invention as well.

In certain embodiments, the NOx-reducing reagent and/or the reactant gas are as described above. In one embodiment, the reactant gas includes ammonia and the NOx-reducing reagent includes urea.

In certain embodiments, the apparatus includes a blower configured to maintain a net flow of flue gas through the RHE and into a selective catalytic reduction unit (SCR).

In yet another aspect, the invention relates to a method for producing a reactant gas from a NOx-reducing reagent in a side stream of flue gas from a combustor, the method including the steps of: introducing the flue gas into a multi-chamber RHE; introducing the NOx-reducing reagent into a retention chamber portion of the RHE, wherein the retention chamber is maintained at a sufficient temperature for production of the reactant gas; conducting flue gas containing the reactant gas from the RHE into an SCR; and reversing flow of the flue gas through the RHE in cycles while maintaining a net flow of flue gas into the SCR. The description of elements of the embodiments above can be applied in this aspect of the invention as well.

In other aspects similar to those above, the invention relates to a regenerative heat exchanger for producing a reactant gas from a NOx-reducing reagent in a stream of air, wherein the stream of air is not necessarily a side stream of flue gas from a combustor but may be any stream of air, for example, any exhaust stream from a combustor. The description of elements of the embodiments above can be applied in these aspects of the invention as well.

BRIEF DESCRIPTION OF THE DRAWING

The objects and features of the invention can be better understood with reference to the drawing described below, and the claims. The drawing is not necessarily to scale, emphasis instead generally being placed upon illustrating the principles of the invention.

DETAILED DESCRIPTION

Figure 1:
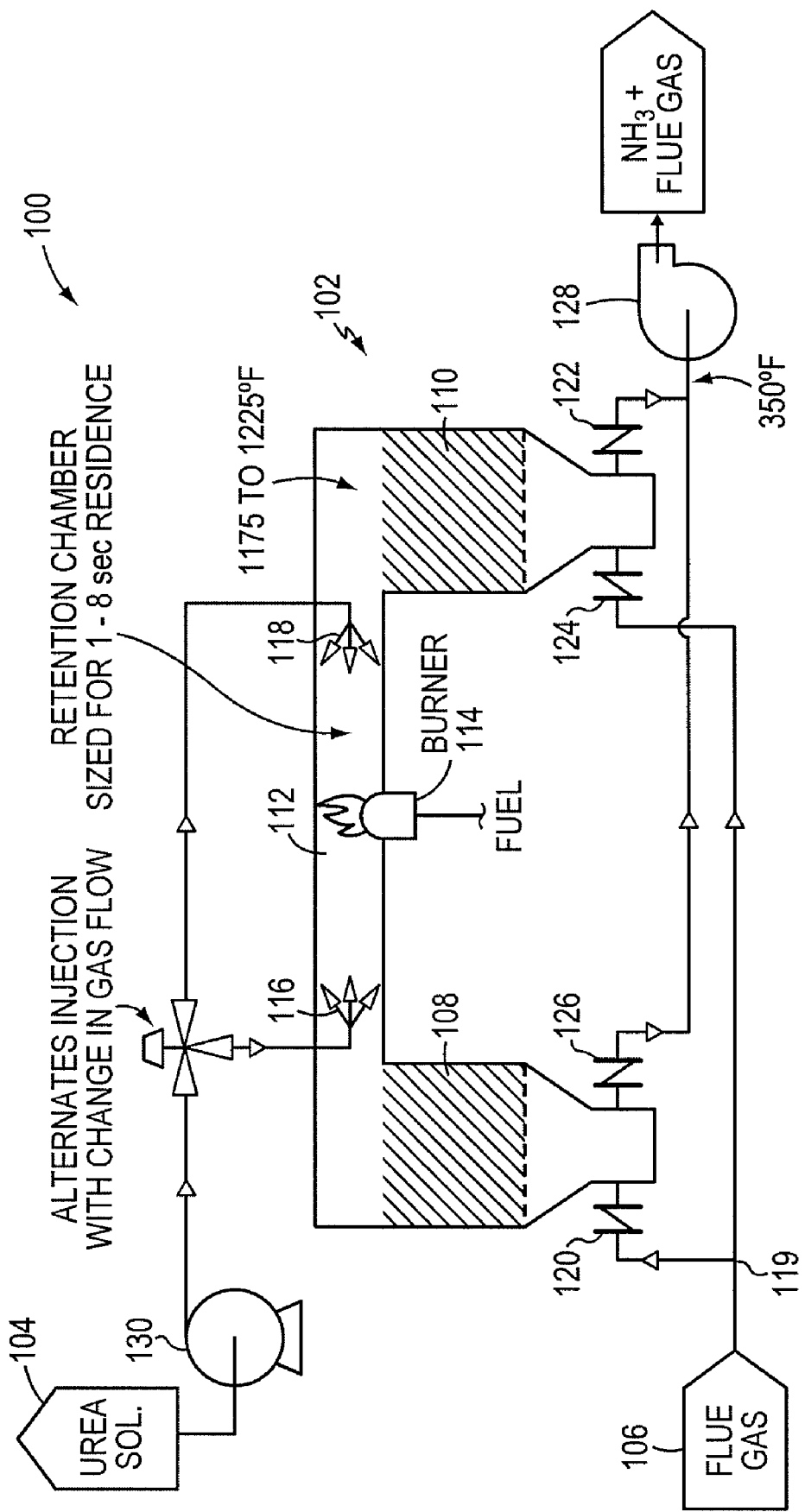
FIG. 1 depicts a dual chamber regenerative heat exchanger (RHE) for conversion of urea to ammonia in a side stream of flue gas, according to an illustrative embodiment of the invention.

As used herein, a "combustor" is understood to include any unit, system, or apparatus which combusts one or more carbonaceous fuels to provide heat, e.g., for direct or indirect conversion to mechanical or electrical energy. Carbonaceous fuels include the hydrocarbons normally used as fuels, as well as combustible waste materials such as municipal solid waste, industrial process waste, and the like. Burners and furnaces, as well as internal combustion engines of the Otto, Diesel, and turbine types, are included within the term "combustor" and can benefit from the invention. Large-scale combustors are considered as most benefiting from the invention, although stationary and mobile combustors of all types are contemplated as well.

As used herein, "flue gas" is understood to mean any gas exhausted from, or generated by operation of, a combustor, or part of a combustor. In general, a large-scale combustor burns fuel with the resulting production of flue gas containing nitrogen oxides (NOx) that must be at least partially removed.

As used herein, a "side stream" refers to a stream of relatively small volume (or volumetric flow rate) relative to the total volume (or total volumetric flow rate) of flue gas to be treated. In certain embodiments, a side stream is a portion split off a full stream of combustion gases. Alternatively, a side stream is formed by drawing in a stream of air from sources external to the combustor. In certain embodiments, the side stream has a volume (or volumetric flow rate) of about 3% of the total flue gas volume (or volumetric flow rate). In other embodiments, the side stream is about 1%, about 2%, about 4%, about 6%, about 8%, or about 10% of the total flue gas volume (or volumetric flow rate), although amounts higher or lower than these amounts are possible. In certain embodiments, the side stream is less than about 10%, less than about 8%, less than about 6%, less than about 4%, less than about 2%, or less than about 1% of the total flue gas volume (or volumetric flow rate).

Throughout the description, where reagents, reactants, and products are described as having, including, or comprising one or more specific components, or where processes and methods are described as having, including, or comprising one or more specific steps, it is contemplated that, additionally, there are reagents, reactants, and products of the present invention that consist essentially of, or consist of, the one or more recited components, and that there are processes and methods according to the present invention that consist essentially of, or consist of, the one or more recited processing steps.

It should be understood that the order of steps or order for performing certain actions is immaterial, as long as the invention remains operable. Moreover, two or more steps or actions may be conducted simultaneously.

Scale-up and/or scale-down of systems, processes, units, and/or methods disclosed herein may be performed by those of skill in the relevant art. Processes described herein are generally continuous or semi-continuous processes, but may be adapted for batch operation.

It is contemplated that information from US 2006/0115402 can be used in the practice of and/or adaptation of the embodiments of the invention. For example, it is contemplated that the methods, apparatus, units, materials, devices, systems, and/or processes described in US 2006/0115402 can be used in various embodiments of the invention.

FIG. 1 is a diagram 100 depicting a dual chamber regenerative heat exchanger (RHE) 102 for conversion of an aqueous urea solution 104 (NOx-reducing reagent) to a reactant gas containing ammonia. The conversion of urea takes place in the presence of a volume of flue gas that has been diverted into the dual chamber RHE 102 from a typically much larger volume of flue gas from a combustor. For example, the side stream flue gas may have a volumetric flow rate that is about 3% of the overall flue gas volumetric flow rate.

Between the two chambers 108, 110 is a retention chamber 112 which is maintained at high temperature (e.g. between 1175° F. and 1225° F.) by operation of a burner 114. The temperature of the retention chamber is sufficient to convert the injected aqueous urea solution (shown injected into the retention chamber at 116 and 118) into gaseous ammonia and carbon dioxide, and the retention chamber 112 is sized to provide adequate residence time (e.g. from about 6 to about 8 seconds, depending on flue gas flow rate and other factors) for substantially complete conversion of the urea. The RHE 102 operates at about ambient pressure and does not require high pressure valves or other high pressure equipment.

The RHE 102 may be sized depending on the amount of ammonia the process requires. For example, the RHE 102 may be sized to provide ammonia production in the range from about 50 lb/hr to about 5000 lb/hr, although amounts below and above this range are possible.

In general, the lines of flue gas to each chamber are connected by a common duct connection 119. By simultaneously opening the inlet valve on one chamber 120 and the outlet valve on the other chamber 122, the first cycle begins and runs for a certain period of time, for example, from about one to about two minutes. Then, the other set of inlet and outlet valves (124, 126) open, and the first set (120, 122) close quickly. The result is that the flow direction through the RHE reverses, but the net flow continues to be from the flue gas duct 119, through the RHE, and through a blower 128, into an SCR injection grid or other injection device.

The RHE outlet gas can be mixed with the rest of the flue gas from the combustor and introduced into an ammonia injection grid or upstream of a static gas mixer injection system manufactured by Babcock Power, Incorporated. As an alternative to the downstream SCR process, an SNCR or combined SCR/SNCR process can be used for reduction of NOx in the flue gas. Examples of SCR processes which can be used or adapted for use in various embodiments of the invention are described in US2006/0115402.

The aqueous urea solution 104 is transferred via pump 130 to an injection system. The urea injection nozzles at 116 and 118 preferably introduce fine droplets into the retention chamber 112. For example, air assisted atomizer(s) or mechanical atomizer(s) may be used. Various arrangements of the urea injection system may be developed to optimize conversion of urea to reactant gas. For example, location and timing of urea solution injection may be coordinated with the alternating flow direction of gas through the RHE.

Selective Catalytic Reduction of NOx

The illustrative embodiments described herein provide urea-based SCR processes that can advantageously utilize the enthalpy of the flue gas, which can be supplemented if need be, to convert urea to ammonia. This makes use of the easy handling feature of urea reagent and provides complete gasification and good mixing employing a side stream gas mass to provide thorough mixing required for high levels of NOx reduction. In particular embodiments, heat necessary for gasification is derived from the enthalpy of the combustion gases.

The process is effective with urea, but can utilize other NOx-reducing reagents capable of generating a reactant gas containing ammonia upon heating. When certain of these reagents are gasified, the reactant gas will also contain HNCO which reacts with water to convert to ammonia and carbon dioxide. It is an advantage of the invention that this can be easily achieved without prehydrolysis of the NOx-reducing reagent which has the attendant risk of plugging nozzles and other equipment. The term "gasification" means that substantially all of the urea is converted into a gas, leaving no significant dissolved or free solids or liquid to contact with and foul SCR catalysts.

The term "urea" is meant to include the reagents that are equivalent to urea in the sense that they form ammonia and HNCO when heated, whether or not they contain large amounts of the pure chemical urea in the form introduced into the combustion gases; however, the reagents that are equivalent to urea typically contain measurable quantities of urea in their commercial forms and thus comprise urea. Among the NOx-reducing reagents that can be gasified are those that include one or more members selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret; cyanuric acid; isocyanic acid; urea formaldehyde; melamine; tricyanourea and mixtures of any number of these. Yet other NOx-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and/or byproduct wastes containing urea from a chemical process. Amines with higher alkyls can be employed to the extent that the hydrocarbon components released do not interfere with the NOx-reduction reaction.

The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention. While ammonia need not be utilized at all, the apparatus described herein improves the introduction of SCR reagents including ammonia and thus makes its use more practical.

The urea solution is introduced at a rate relative to the NOx concentration in the combined stream prior to passage through the NOx-reducing catalyst effective to provide an NSR of from about 0.1 to about 2, depending on a number of factors, but more typically is within the range of from 0.5 to 1.1. The term "NSR" refers to the relative equivalents of nitrogen in the urea or other NOx-reducing agent to the equivalents of nitrogen in the NOx in the combustion gases to be treated.

The term "combustor" is meant in the broad sense to include any and all combustors which combust carbonaceous fuels to provide heat, e.g., for direct or indirect conversion to mechanical or electrical energy. These carbonaceous fuels can include the hydrocarbons normally used as fuels as well as combustible waste materials such as municipal solid waste, industrial process waste and the like. Burners and furnaces, as well as, internal combustion engines of the Otto, Diesel and turbine types, are included within the definition of the term combustor and can benefit from the invention. However, since the problems and advantages of successful achievement of reliable NOx reduction on combustors utilizing ammonia as a reducing agent are so pronounced, the large-scale combustor is used throughout this description for purposes of example. Stationary and mobile combustors of all types are, however, contemplated. However, the current invention is not limited to combustor flue gases. Rather, any hot flue gas that can benefit from passing through an SCR reactor for NOx reduction can benefit from this invention.

A side stream is separated from the main effluent stream from a combustor and urea is injected into it at a temperature sufficient to fully decompose or otherwise gasify the urea to active gas species. A large-scale combustor burns fuel with the resulting production of nitrogen oxides (NOx) that must be at least partially removed. A mixing device is optional following adding urea reagent to a side stream and combining the side stream with a main combustion gas stream. The term "side stream" is used herein to refer to a stream of relatively small volume relative to the total volume of combustion gases to be treated by gasified urea and NOx-reduction catalysts. The side stream can be obtained by splitting off a side stream portion of the full stream of combustion gases. The separation in various embodiments can be made before or after treatment. In addition, the side stream can be formed by drawing in a stream of air from sources external of the combustor.

Catalysts are employed in an array forming a reactor and are SCR catalysts as known in the art for reducing NOx utilizing ammonia or urea in various hydrolyzed, gasified, pyrolyzed and like forms. Among the suitable SCR catalysts are those capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative processes described below. Certain selective catalytic reduction processes for reducing NOx are known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato, et al., in U.S. Pat. No. 4,138,469 and Henke in U.S. Pat. No. 4,393,031 disclose the catalytic reduction of NOx using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220° to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori, et al., in U.S. Pat. No. 4,107,272, discuss the catalytic reduction of NOx using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing the reactant gas is preferably passed over the SCR catalyst while the combustion gases including the gasified urea or other reagent are at a temperature of at least about 100° C. and typically between about 180° and about 650° C., preferably above at least about 250° C. In this manner, the active species present in the effluent due to gasification of the reagent solution most effectively facilitate the catalytic reduction of nitrogen oxides and condensation of water is controlled. The effluent will typically contain an excess of oxygen, e.g., up to about 15% of that required to fully oxidize the carbonaceous fuel. Use of the present invention with any of the above SCR catalysts (the disclosure of which are specifically incorporated by reference) reduces or eliminates the requirement for the transport, storage and handling of large amounts of ammonia or ammonium water.

Urea, which decomposes at temperatures above 140° C., is injected from storage 104 (FIG. 1) via nozzles 116,118 with suitable valves and controllers into a flue gas stream 106. To achieve the goal of gasification for a urea or a urea-related NOx-reducing reagent, temperatures above about 300° C. are typically employed for gasification.

The urea solution is desirably maintained at a concentration suitable for storage and handling without precipitation or other problem. Concentrations of from about 5 to 70% can be employed with some degree of practicality, but concentrations of from about 15 to about 50% are more typical. It is an advantage of the invention that the amount of water in the urea solution can be varied alone or with steam added to suitably control the temperature of the gases in the side stream.

The temperature of the gases produced by gasifying reagents in this group should be maintained at a level that prevents their condensation. Typically, the temperature should be maintained at a temperature at least about 150° C., and preferably at least 200° C. A preferred temperature range for the gasification and for transfer of the gases produced by the noted group of reagents, is from about 300° to about 650° C. Ideally, the side stream 106 would decompose the urea into active species without need for further heating. This side stream (e.g., from 0.1 to 25% of the flue gas), typically less than 10% and usually less than 3%, e.g., from 0.1 to 2%, of the volume of the total combustion gases (flue gas), provides the required enthalpy for complete decomposition of urea.

The vessel carrying the side stream 102 provides the required time and gas velocity for urea decomposition. After injection, a residence time from 1 to 10 seconds is typically provided to completely decompose urea and promote the reaction between HNCO and water vapor to form ammonia. Side stream gas velocity of 1 to 20 feet per second is maintained throughout the vessel to optimize vessel dimensions, achieve plug flow, enhance the urea droplet dispersion, evaporation, and decomposition into the side stream, and minimize droplet impingement on vessel walls. Internal channels and multi-walls may be preferred to achieve the optimum gas velocity and to minimize heat loss to outside environment. The optimum vessel design can be derived by using, among others, well-established design tools such as computational fluid-dynamics model.

The urea injection nozzles 116, 118 introduce well-defined droplets. Both air assisted atomizer or a mechanical atomizer can be utilized. Droplet sizes less than 500 microns but typically less than 100 and preferably below 50 microns are desirable to rapidly evaporate and decompose urea droplets. Also in consideration of vessel size, small and slow droplets generated from, e.g., ultrasonic nozzles can be more desirable than large and fast droplets. If desired, steam can be introduced as necessary or desired.

A traditional ammonia injection grid with densely located nozzles requires as low as 0.1% of the total combustor flue gas as the side stream. A static mixer can be used if desired. Alternatively, injection grid can comprise fewer and sparsely-placed nozzles or openings with a static mixer located downstream to obtain a uniform distribution. This alternate design may reduce cost and maintenance associated with the injection grid. The mixing with the flue gas is facilitated due to an order of magnitude higher mass of side stream, e.g., 1 to 2% of the flue gas, compared to that injected through an ammonia injection grid (AIG) in a traditional ammonia SCR process. Thus, the current embodiment provides the flexibility to the type of injection grid depending on the application requirements.

It is an advantage of this and other embodiments of the invention that because relatively large volumes of side stream gases are mixed with the urea solution prior to introducing the gases into the SCR catalyst, an overt mixing procedure is not essential. It will be advantageous in many cases, especially where there is a high degree of fluctuation in gas volumes, to provide means for mixing the gases at one or more stages. Among the suitable mixing means are static mixers, cyclones, blowers and other process equipment that by design or effect mixes the gases.

It is another advantage of this embodiment of the invention that by utilizing the side stream comprised of combustion gases prior to full heat exchange, the enthalpy of the gases is utilized for gasification by direct heat exchange with the aqueous urea solution. Direct heat exchange in this manner using supplementary heat only as needed under low-load conditions—when the need for NOx reduction is also low—will be much more efficient than employing supplementary heat in a cold stream to gasify urea. Advantageously, also, the addition of supplemental heat to the side stream can be an effective means to control the temperature in the side stream for consistent urea decomposition and SCR catalyst and maintain both temperatures within its effective temperature range.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. Insofar as this is a provisional application, what is considered applicants' invention is not necessarily limited to embodiments that fall within the scope of the claims below.

What is claimed is:

1. A process comprising a regenerative heat exchanger unit configured to produce a reactant gas comprising ammonia from a reagent comprising urea in a side stream of flue gas from a combustor.

2. The process of claim 1, wherein the reactant gas is carried along with the flue gas from the regenerative heat exchanger unit into a selective catalytic reduction unit.

3. The process of claim 1, wherein the regenerative heat exchanger unit comprises at least two chambers.

4. The process of claim 3, wherein the regenerative heat exchanger unit is a dual-chamber regenerative heat exchanger unit in which gas flow reverses direction in cycles.

5. A method for producing a reactant gas comprising ammonia from a reagent comprising urea in a side stream of flue gas from a combustor, the method comprising the steps of:
   (a) introducing the flue gas into a multi-chamber regenerative heat exchanger unit;
   (b) introducing the reagent comprising urea into a retention chamber of the regenerative heat exchanger unit, wherein the retention chamber is maintained at a sufficient temperature for production of the reactant gas comprising ammonia;
   (c) conducting flue gas containing the reactant gas from the regenerative heat exchanger unit into a selective catalytic reduction unit; and
   (d) reversing flow of the flue gas through the regenerative heat exchanger unit in cycles while maintaining a net flow of flue gas into the selective catalytic reduction unit.

* * * * *